United States Patent [19]

Alder

[11] Patent Number: 5,050,050
[45] Date of Patent: Sep. 17, 1991

[54] AUXILIARY BRAKE LAMP

[75] Inventor: Dietmar Alder, Geseke, Fed. Rep. of Germany

[73] Assignee: Hella KG Hueck & Co., Lippstadt, Fed. Rep. of Germany

[21] Appl. No.: 616,592

[22] Filed: Nov. 21, 1990

[30] Foreign Application Priority Data

Nov. 23, 1989 [DE] Fed. Rep. of Germany ....... 8913812

[51] Int. Cl.$^5$ ............................................. B60Q 1/26
[52] U.S. Cl. ..................................... 362/80.1; 362/61
[58] Field of Search ........................... 362/80.1, 83, 61

[56] References Cited

U.S. PATENT DOCUMENTS 4,945,456  7/1990  Kakidaira ........................... 362/80.1

FOREIGN PATENT DOCUMENTS 0046717  10/1985  European Pat. Off. .
8022313   2/1981  Fed. Rep. of Germany .
8100244   7/1981  Fed. Rep. of Germany .

Primary Examiner—Carroll B. Dority
Attorney, Agent, or Firm—Griffin Branigan & Butler

[57] ABSTRACT

An auxiliary brake lamp includes a lamp housing (1) defining a rectangular light exit port having a reflector (2) positioned therein which is covered by a releasably mounted light-transmission shield (3). Opposite edges of the light-transmission shield are attached to the rest of the auxiliary brake lamp by shield-attaching devices (11, 15) on opposite edges of the light-transmission shield and corresponding attaching devices (8, 13) for mating therewith on the reflector at one edge and on the housing at the other edge.

6 Claims, 1 Drawing Sheet

U.S. Patent  Sep. 17, 1991  5,050,050
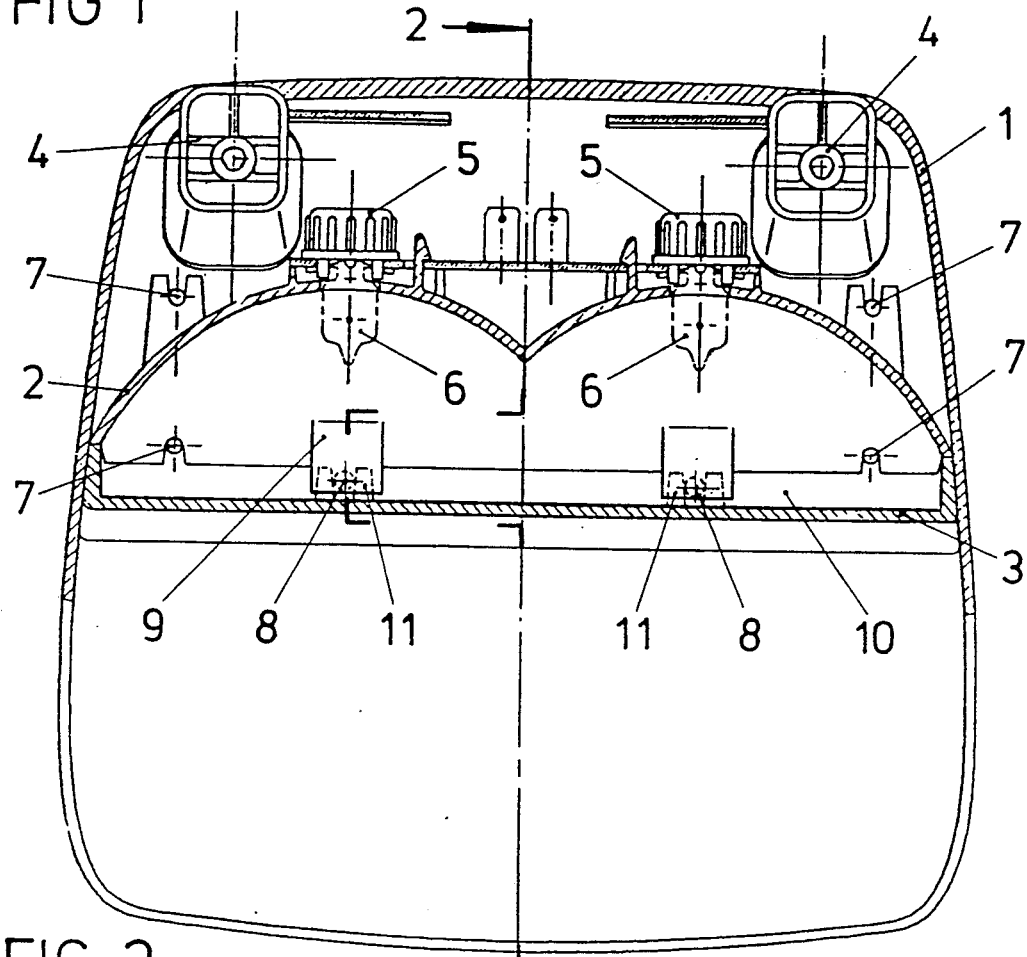
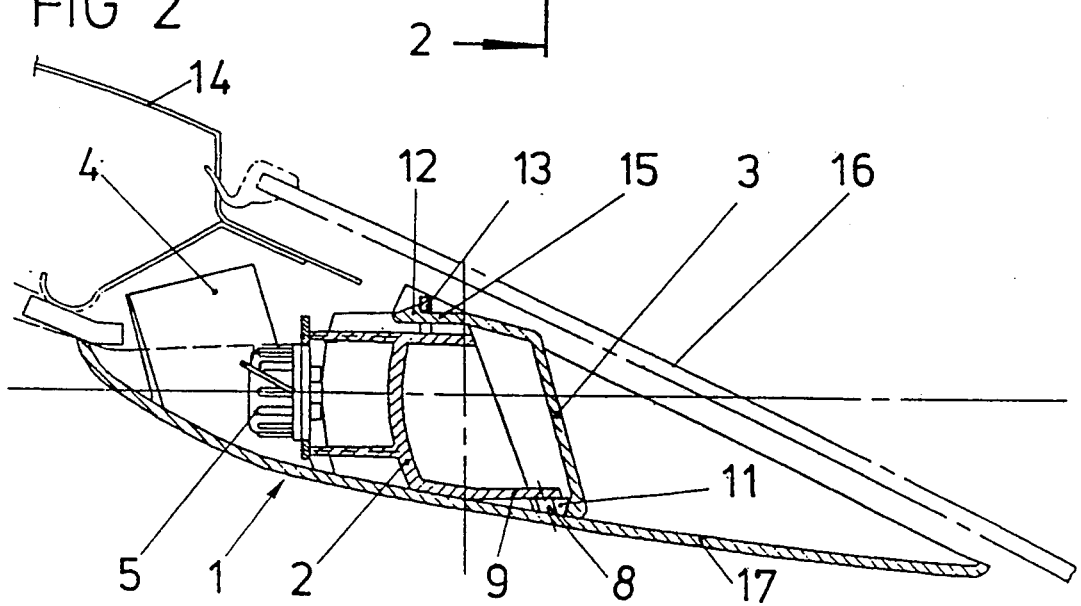

AUXILIARY BRAKE LAMP

BACKGROUND OF THE INVENTION

This invention relates to an auxiliary brake lamp of a type comprising a reflector arranged in a bowl-shaped housing having a rectangular light exit port covered by a releasably-mounted light-transmission shield with the open side of the housing being adjacent to and mountable at a vehicle body with a portion of the housing extending above the reflector in the manner of a hat or cap bill which, in a mounted position, places the lamp adjacent a rear windshield.

Such a light is known in the prior art.

An object of this invention is to so attach a light-transmission shield of such a lamp that it securely encloses, or seals, a reflector, has a rattle-free seating, but yet can be selectively removed and reattached to replace light bulbs.

SUMMARY OF THE INVENTION

Attachment of a light-transmission shield is made at long edges thereof, with attaching apparatus corresponding to shield attaching apparatus on the light-transmission shield being arranged on the reflector at one edge and on the housing at the other edge.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 1 is a center horizontal cross section through a lamp of this invention; and FIG. 2 is a cross section taken on line B-B in FIG. 1.

DESCRIPTION OF PREFERRED EMBODIMENT

A reflector 2 is positioned in a lamp housing 1 which is covered by a light-transmission shield 3 and which lies against an interior surface of a rear windshield 16. The light housing is bowl-shaped with its open side adjacent a vehicle body an being attached threat, a portion of the housing 17 projecting beyond the rflector in a manner of a cap bill or brim which in a mounted position is adjacent the rear windshield 16. Attaching devices 4 are included on the lamp housing 1 for mounting on a vehicle body 14. Bulb sockets 5 are mounted on the reflector 2 for receiving light bulbs 6 which are installed from the rear. To mount the reflector 2 to the housing 1, pins, or studs, 7 are formed directly on the housing for extending into, and engaging in, recesses of the reflector 2, with their ends being formed like rivet heads. A reflector wall in areas of pins, or studs, 8 are formed as spring tongues 9 which extend laterally from, or above, a remaining reflector rim surface as well as from the pins 8. W-formed recesses are made in a lower edge of the light- transmission shield 3 which form spring forks 11 for defining U-shaped recesses between legs thereof, to be corresponding attachment devices to the pins 8 forming the attachment devices of the housing. The spring forks 11 are so made that they springingly extend about and form-fittingly engage the pins 8 of the housing 1 while, at the same time, they are covered by the reflector rim, or edge, spring tongues 9. At the edge, or rim, of the light-transmission shield 3 opposite to the position of the spring tongues 11, is a spring tongues 15 on which an engaging nose 12 is formed to extend into, and form-fittingly, resiliently, engage with an engaging shoe 13 of the reflector wall. In this manner, the light-shield 3 can be pressed in a direction opposite to a light exiting direction onto a reflector opening and self locks to be engaged in a play-free manner with the reflector 2 in one place and with the housing 1 in two places.

A particularly beneficial, while structurally uncomplicated, solution results from constructing the attachment devices of the housing as pins or studs formed directly on the housing and extending into its cavity.

Further, it is beneficial that the reflector wall in areas of the pins are constructed as spring tongues which extend laterally to the remaining outer rim edge of the reflector as well as to attaching pins. Because the attaching device of the light-transmitting shield corresponding to the reflector is formed as a spring tongue having an engaging nose at is free end for extending into and resiliently, U-form-fittingly, engaging with a corresponding engaging shoe of the reflector wall, the tongue forms a guide that makes possible insertion of the forks of the light-transmission shield, without difficulty, onto the pins and holds the forks of the light-transmission shield down in gripping areas of the pins. This is particularly vital when mounting the light-transmission shield on the reflector which is attached in the housing.

Additionally, it is beneficial, as already suggested, that the attaching devices of the light-transmission shield corresponding to those of the housing are spring forks, resiliently, form fittingly, engaging about the pins in the housing, with the spring forks being formed by making W-shaped recesses in the edge or rim of the light-transmission shield for defining U-shaped recesses. This manner of catch ensures a relatively good seal and particularly rattle-free seating of the light-transmission shield between the housing and the reflector.

While the invention has been particularly shown and described with reference to a preferred embodiment, it will be understood by those skilled in the art that various changes in form and detail may be made therein without departing from the spirit and scope of the invention.

The embodiments of the invention in which an exclusive property or privilege are claimed or defined are as follows:

1. In an auxiliary brake lamp of a type comprising a lamp housing defining a rectangular light exit port and having a reflector positioned therein which is covered by a releasably-mounted light-transmission shield, the lamp housing being bowl shaped with its open side adjacent a vehicle body and being attached thereat, a portion of the housing projecting beyond the reflector in the manner of a cap bill which in a mounted position is adjacent a rear windshield, the improvement wherein:

apparatus for attaching opposite edges of the light-transmission shield to the rest of the auxiliary brake lamp at long edges of the light transmission shield includes shield-attaching means on opposite rim edges of the light-transmission shield, and corresponding attaching means for mating with said shield-attaching means being arranged on the reflector at one edge and on the housing at the other edge.

2. In an auxiliary brake lamp as in claim 1 wherein the corresponding attaching means on the housing are pins affixed directly on the housing and extending thereinto.

3. In an auxiliary brake lamp as in claim 1 wherein the reflector, in areas of the pins, includes spring tongues extending above a remainder of an outer rim of the reflector as well as above said shield attaching means.

4. In an auxiliary brake lamp as in claim 1 wherein the shield attaching means for mating with the reflector is a spring tongue having an engaging nose at a free outer end thereof and wherein the corresponding attaching means of the reflector includes an engaging shoe, the engaging nose extending into and resiliently form locking with the engaging shoe.

5. In an auxiliary brake lamp as in claim 4 wherein the shield attaching means corresponding to an attaching means on the light housing comprises a spring fork while the attaching means on the light housing comprises a pin, with the spring fork extending about and resiliently, form fittingly, locking with the pin.

6. In an auxiliary brake lamp as in claim 5 wherein the spring fork defines a U-shaped recess in an edge of the light transmission shield.

* * * * *